United States Patent [19]

Nakamura

[11] Patent Number: 5,216,553
[45] Date of Patent: Jun. 1, 1993

[54] MAGNETIC RECORDING CIRCUIT HAVING A STORAGE FEATURE DEPENDENT UPON TRACK LOCATION

[75] Inventor: Akira Nakamura, Kyoto, Japan
[73] Assignee: Rohm Co. Ltd., Kyoto, Japan
[21] Appl. No.: 431,216
[22] Filed: Nov. 3, 1989
[30] Foreign Application Priority Data Nov. 14, 1988 [JP] Japan .................. 63-148255[U]

[51] Int. Cl.⁵ .......................... G11B 5/09; G11B 5/02
[52] U.S. Cl. ......................................... 360/46; 360/68
[58] Field of Search ................. 360/46, 65, 61, 67, 360/68; 369/47, 50, 52–54

[56] References Cited

U.S. PATENT DOCUMENTS

| | | | |
|---|---|---|---|
| 2,901,737 | 8/1959 | Stovall, Jr. | 360/65 |
| 4,142,210 | 2/1979 | Otobe et al. | 358/128 |
| 4,479,152 | 10/1984 | Chi | 360/65 |
| 4,722,010 | 1/1988 | Suzuki et al. | 360/46 |
| 4,866,692 | 9/1989 | Saito et al. | 369/59 |
| 4,882,639 | 11/1989 | Nasu et al. | 360/65 |
| 4,894,817 | 1/1990 | Tanaka et al. | 369/54 |

*Primary Examiner*—Aristotelis Psitos
*Assistant Examiner*—Won Tae C. Kim
*Attorney, Agent, or Firm*—Oliff & Berridge

[57] ABSTRACT

A magnetic recording circuit capable of recording information on a disk-shaped magnetic recording medium such as a floppy disk. In storing the information on the recording medium, a write current is varied in quantity more smaller for a more inner track and more larger for a more outer track. The current to flow to a write coil is controlled by selecting one of a plurality of current-mirror output-side transistors through which the current may flow. This selecting is performed by a track counter which realizes a storage track by counting a string of count signals corresponding to the location of the track.

9 Claims, 3 Drawing Sheets

MAGNETIC RECORDING CIRCUIT HAVING A STORAGE FEATURE DEPENDENT UPON TRACK LOCATION

BACKGROUND OF THE INVENTION

1. Field of the Invention

This invention relates to a magnetic recording circuit for storing information on a magnetic recording medium such as a floppy disk.

2. Description of the Related Art

As advances have been made in recent years in computer technology, the importance of magnetic recording and reproducing devices such as a floppy disk and a hard disk, as an external storage means of a computer, are on the rise. For instance, these magnetic recording means have been widely used also in office automation equipments such as a personal computer, a microcomputer, a word processor, etc.

In general, in recording information on a floppy disk, a magnetic head is brought in intimate contact with the magnetic recording surface of a floppy disk rotating at a constant speed, and a write/read coil built in the magnetic head is excited to be operative as a current flows in the coil.

The magnetic recording method will now be described in greater detail with reference to FIGS. 2 and 3 of the accompanying drawings.

A floppy disk 10 is donut-shaped and stores information according to the magnetizing direction of a magnetic substance layer formed on the surface of the disk. The recording portion in the floppy disk 10 is divided into a predetermined number of tracks, e.g., about eighty annular tracks each subdivided into a plurality of circumferential sectors. Storage of information is performed according to the magnetizing directions one for each of predetermined sections in the individual sectors.

When data of "0" and "1" shown in FIG. 3(A) are to be stored, the data are first converted into a signal shown in FIG. 3(B), for example. This type of modulation system is called an FM modulation system. If there is a pulse signal between adjacent predetermined clock signals, it means "1"; and if there is no pulse signal between adjacent clock signals, then it means "0". In accordance with this signal, magnetization in the pattern such as shown in FIG. 3(C) is taken effect on the floppy disk. The modulation system shown in FIGS. 3(D) and 3(E) is an MFM modulation system, in which part of a clock signal is omitted.

Thus storage f information on the floppy disk 10 is taken effect by magnetizing the magnetic substance according to a predetermined system. Since the floppy disk 10 is doughnut-shaped as shown in FIG. 2, the areas of the individual tracks increase progressively from the inside toward the outside. Consequently the area to be magnetized for recording a datum is larger in an outer track than in an inner track, which necessitates increasing the magnetic flux density higher in an outer track than in an inner track when magnetizing.

To this end, it has hitherto been a common practice to divide the recording portion of the floppy disk 10 into an inner region (a) and an outer region (b), and in storing data in the outer region (b), to increase the quantity of current to be supplied to the write coil, thereby increasing the magnetic flux density.

FIG. 4 illustrates an example of the abovedescribed prior art magnetic recording circuit. In FIG. 4, by a current to flow in the write/read coil 20, a predetermined magnetizing treatment is taken effected on the surface of the floppy disk located in intimate contact with this coil 20. Apart from a certain external parts, these circuits are integrated on a single semiconductor chip.

Centrally in the coil 20 outside the integrated circuit, a center tap connected to a power source $V_{cc}$ is located and is connected at opposite ends to a pair of differential transistors 22, 24 via a pair of pins P, P, respectively. The emitters of these two differential transistors 22, 24 are connected to the ground via a common current-limiting transistor 26. To the bases of the differential transistors 22, 24, signals from a recording control circuit 28 are introduced. If any one of the differential transistors 22, 24 is rendered conductive, a current determined by the transistor 26 flows in the coil 20 in a predetermined direction.

Meanwhile, the quantity of current to flow to the transistor 26 is determined by the quantity of current to flow to the transistor 29 constituting a current mirror. Here a transistor 30 is a buffer transistor for constituting a current mirror. Further, the potential at the collector side of the transistor 29 is kept at a predetermined level by a constant voltage circuit 31 in the integrated circuit.

The quantity of current to flow to this transistor 29 is determined by a pair of exterior resistors 32, 34. That is, since a switching transistor 36 is connected to the parallel resistor 34 in series, the resistors 32, 34 are interconnected in parallel when the switching transistor 36 assumes an operative state. When the switching transistor 36 assumes an inoperative state, the resistor 34 is separated from the circuit so that a current flows to the transistor 29 only via the resistor 32. Therefore the quantity of current to flow to the transistor 29, namely, the write current to flow to the write coil 20 can be controlled by selectively bringing the switching transistor 36 into an operative state or inoperative state. Designated by 38 are a pair of diodes which serve to prevent any reverse current flow.

Thus by switching the transistor 36 between operative and inoperative, it is possible to control the quantity of write current in the inner region (a) and the outer region (b), individually, of the floppy disk 10 (FIG. 2). Designated by 39 is a reproducing circuit for reading and reproducing the information recorded on the floppy disk.

Also in the conventional magnetic recording circuit, it is known to take a change-over of the exciting current between two values depending on the outer and inner tracks of a floppy disk. Because the area of each track is different from that of any other track, it is preferred to take a change-over of the write current for each and every track.

However, with the conventional arrangement, such a fine change-over of the write current was not considered. Yet assuming that it could be realized, since this current value was adjusted by the external resistors, it should have increased the number of kinds of external resistors to vary the value of an exciting current in an effort to meet with the individual tracks exactly. Further, since the resistors are exterior, it is necessary to use as many signal input terminals as the number of steps to be changed over increases, thus enabling only an inadequate change-over of the write current.

SUMMARY OF THE INVENTION

It is therefore an object of this invention to provide a magnetic recording circuit with which it is possible to give to a coil a write current of a suitable value selected from a desired number of steps by switching a switching transistor inside an integrated circuit between operative and inoperative states.

According to this invention, a magnetic recording circuit comprises: a coil for imparting a magnetic recording medium a predetermined magnetizing action to store given information; a storage circuit for controlling a supply of current to the coil; a current-mirror input-side transistor connected to a current source for accepting a predetermined current therefrom to flow in the current-mirror input-side transistor; a plurality of current-mirror output-side transistors each connected at its base to a base of the current-mirror input-side transistor for controlling the flowing of the predetermined current; a plurality of resistors each connected between the current-mirror input-side transistor and the base of a respective one of the current-mirror output-side transistors for adjusting the quantity of current in the respective current-mirror output-side transistor; a plurality of switching transistors each connected to the base of a respective one of the current-mirror output-side transistors for selectively bringing the respective current-mirror output-side transistor into an operative state or an inoperative state in response to the state of the individual switching transistor; an means for detecting a storage track when the given information is stored on the magnetic recording medium, whereby the switching transistors selectively assume the operative state or inoperative state, depending on a detected value of the track detecting means, to bring required ones of the current-mirror output-side transistors in the operative state so that a required current corresponding to the storage track may flow to the coil.

With this arrangement, the quantity of a write current to store the information on the magnetic recording medium is determined in terms of the current quantity of the individual current-mirror output-side transistor. This magnetic recording circuit includes a plurality of current-mirror output-side transistors; the current quantity of each current-mirror output-side transistors is adjusted by the respective resistor disposed in the respective base circuit.

Consequently it is possible to force a desired quantity of current to flow to the coil by bringing the individual current-mirror output-side transistor into its operative state by the switching transistor.

For example, if the switching transistor is changed over by an individual signal issued from the track counter for each and every track, it is possible to vary the write current to a desired value matching the individual track.

The above and other advantages, features and additional objects of this invention will be manifest to those versed in the art upon making reference to the following detailed description and the accompanying drawings in which a structural embodiment incorporating the principles of this invention is shown by way of illustrative example.

DETAILED DESCRIPTION

Figure 1:
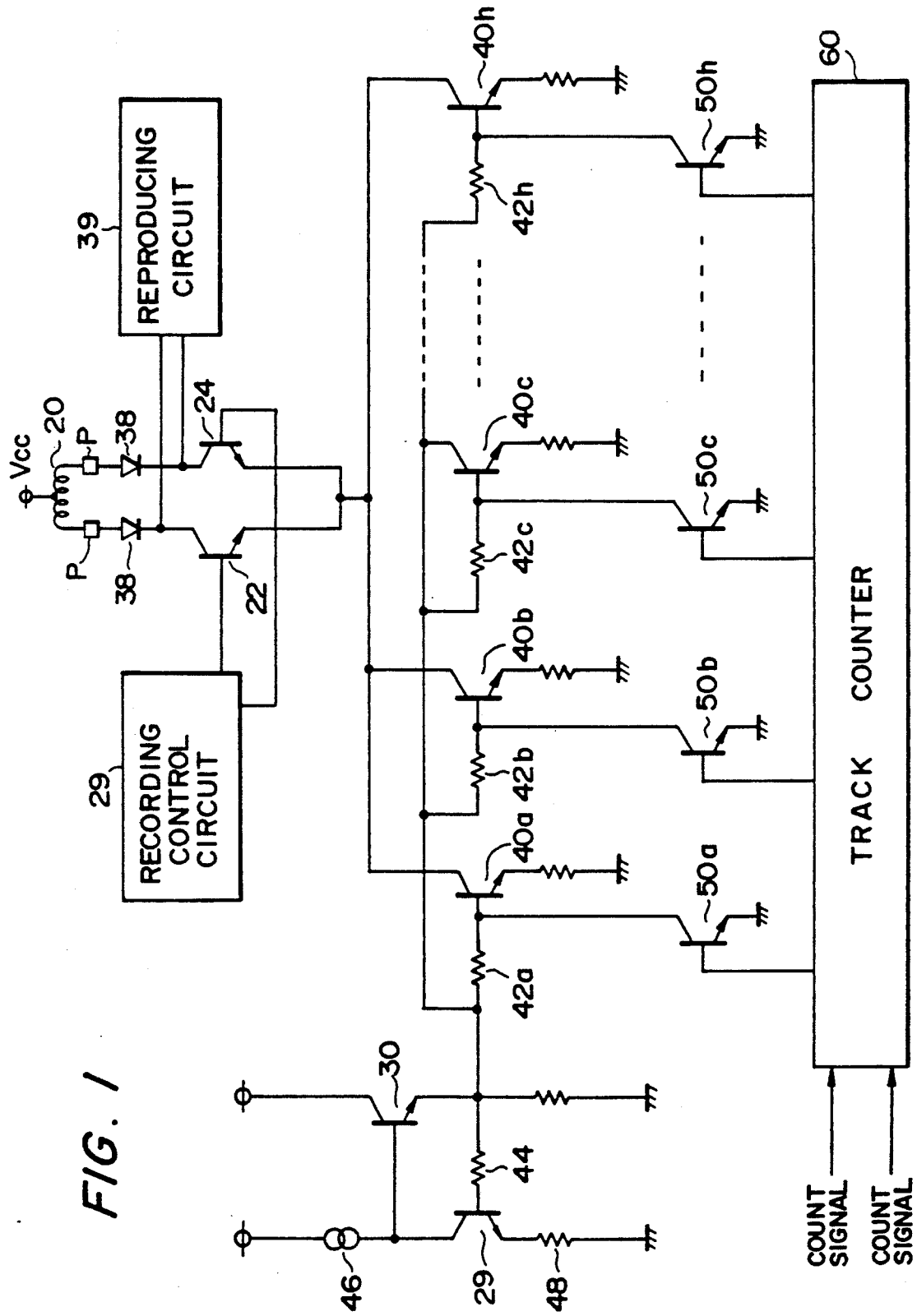
FIG. 1 is a circuit diagram showing a magnetic recording circuit embodying this invention.
Figure 2:
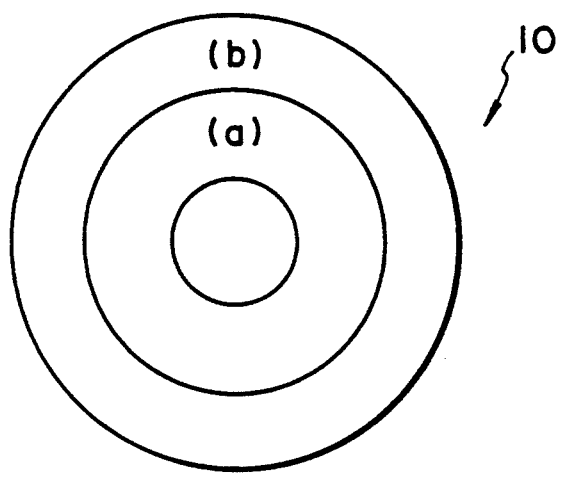
FIG. 2 is a schematic plan view of a floppy disk.
Figure 3A:
FIG. 3A—3E is a diagram showing the order of procedures in which information is stored.
Figure 3B:
Figure 3C:
Figure 3D:
Figure 3E:
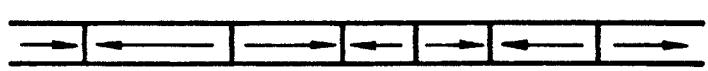
Figure 4:
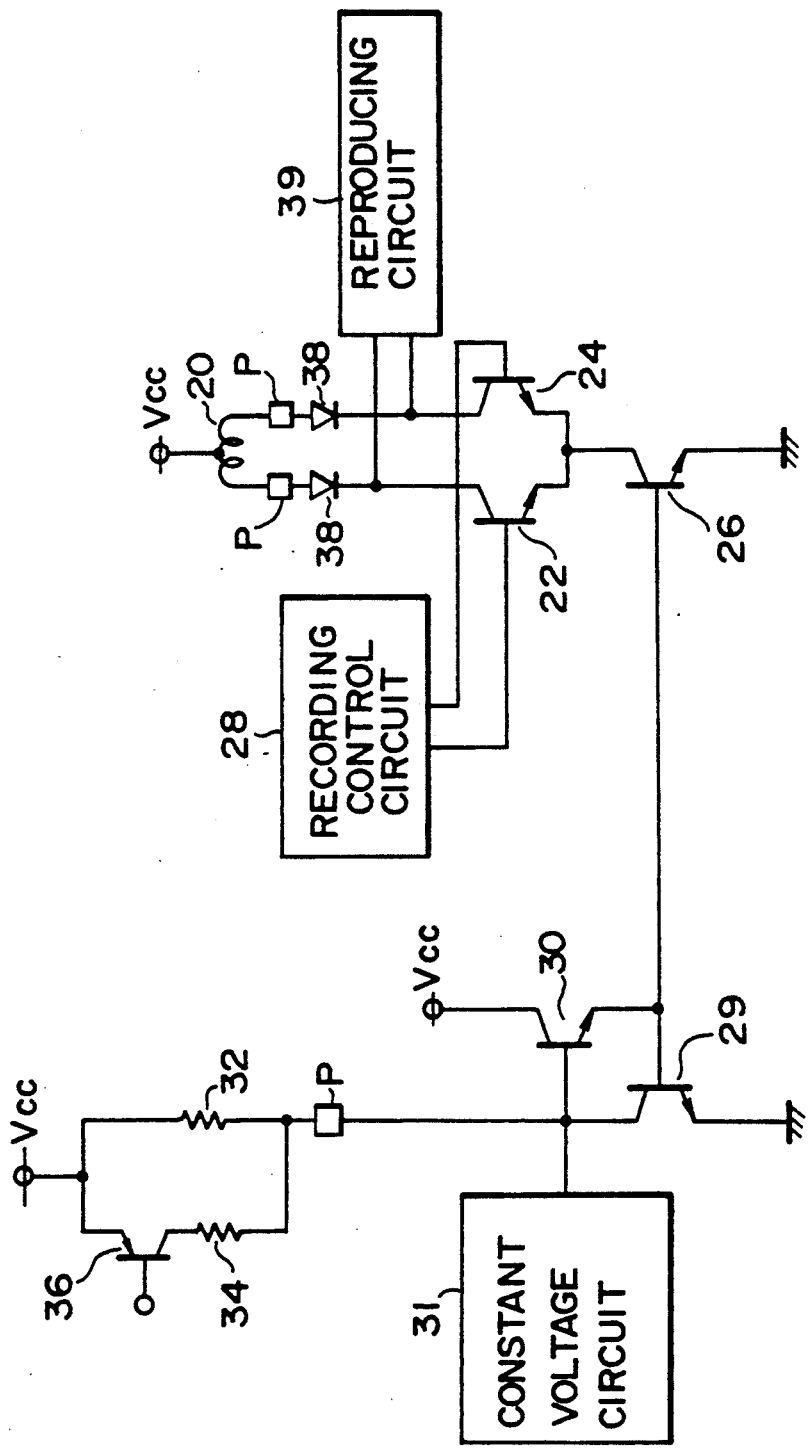
FIG. 4 is a circuit diagram showing a typical prior art magnetic recording circuit.

The principles of this invention are particularly useful when embodied in a magnetic recording circuit such as shown in FIG. 1.

In FIG. 1, the orientation of a current to flow to a coil 20 is taken effect as a pair of differential transistors 22, 24 selectively assume their operative and inoperative states by a signal from a recording control circuit 29.

For a significant feature of this invention, a plurality of (e.g., eight) current-mirror output-side transistors 40$a$, 40$b$, 40$c$, ... 40$h$ for current-limiting are located downstream of the differential transistors 22, 24. The collectors of these current-mirror output-side transistors 40$a$–40$h$ are connected to the differential transistors 22, 24, with the emitters of the transistors 40$a$–40$h$ being grounded. The bases of the current-mirror output-side transistors 40$a$-40$h$ are connected to a current-mirror input-side transistor 29 via a plurality of a current-adjusting resistors 42$a$, 42$b$, 42, ... 42$h$, respectively.

Between the base of the current-mirror input-side transistor 29 and the joint of the emitter of a buffer transistor 30 and a base-connection circuit of the current-mirror input-side and output-side transistors 29, 40$a$–40$h$, a resistor 44 is located for the basis of current adjustment.

The collector of the current-mirror input-side transistor 29 is connected to a constant current source 46, while the emitter of the same transistor is grounded via a resistor 48.

In the circuit thus constructed, it is assumed that the current-mirror output-side transistors 40$a$–40$h$ have a common current charasteristic and also that the individual resistance values of the current-adjusting resistors 42$a$, 42$b$, 42$c$, ... 42$h$ are equal to 1 (1/1$^0$), $\frac{1}{2}$ ($\frac{1}{2}^1$), $\frac{1}{4}$ ($\frac{1}{2}^2$), ... 1/128 ($\frac{1}{2}^7$), respectively, of the resistance value of the resistor 44. With these resistance values thus set, it is possible to set the quantity of current to flow the individual current-mirror output-side transistors 40$a$–40$h$ selectively at 1–$\frac{1}{2}^7$ times values with respect to a given initial current to flow the current-mirror input-side transistor 29. Accordingly, by these eight current-mirror output-side transistors 40$a$–40$h$, it is possible to set the current of from 1 to 1/128 largeness in the unit value of 1/128.

The switching of the individual current-mirror output-side transistors 40$a$, 40$b$, 40$c$, ... 40$h$ between the operative and inoperative states is performed by a plurality of switching transistors 50$a$, 50$b$, 50$c$, ... 50$h$ connected to the respective bases of the current-mirror output-side transistors 40$a$–40$h$. Thus as a selected one of the switching transistors is brought in its operative state, a corresponding one of the current-mirror output-side transistors is rendered inoperative so that the quantity of current to flow to the coil 20 can be set to a desired value.

The change-over of the individual switching transistors 50$a$–50$h$ between operative and inoperative states are taken effected by a signal from the track counter 60. When storing the information in an individual track of a floppy disk, the track counter 60 recognizes that track by counting a string of count signals inputted. In this illustrated embodiment, the track counter 60 has prememorized the data as to which one of the current-mirror output-side transistors 40a–40h should be rendered operative depending on the track in which the information is to be stored. Therefore, by supplying a predetermined high-level signal to a corresponding one of the switching transistors 50a–50h depending on the particular track in which the information is to be stored, it is possible to perform a magnetic recording by a desired write current depending on the track.

In this illustrated example, eight current-mirror output-side transistors, eight switching transistors and eight associated parts such as current-adjusting resistors are used. Alternatively, the number of each of these kinds of components may be increased to achieve an increased number of change-over steps.

Further, every transistor used here is an n-p-n transistor and may be a p-n-p transistor as desired.

The principles of this invention can be applied to not just floppy disks but also hard disks.

According to the magnetic recording circuit of this invention, it is possible to have a desired current to flow to the write coil by selectively switching on or off a plurality of switching transistors contained in the integrated circuit, thus enabling a desired storing depending on the location of a track. Specifically, if the individual switching transistors are rendered operative or inoperative depending on a signal from the track counter, it is possible to vary the write current in quantity for each and every track, thus guaranteeing an ideal storing characteristic.

What is claimed is:

1. A magnetic recording circuit comprising:
   (a) a coil for imparting a magnetic recording medium a predetermined magnetizing action to store given information;
   (b) a storage circuit for controlling a supply of current to said coil;
   (c) a current-mirror input-side transistor connected to a current source for accepting a predetermined current therefrom to flow in said current-mirror input-side transistor;
   (d) a plurality of current-mirror output-side transistors each connected at its base to a base of said current-mirror input-side transistor for controlling the flowing of said predetermined current;
   (e) a plurality of resistors each connected between said current-mirror input-side transistor and the base of a respective one of said current-mirror output-side transistors for adjusting a quantity of current in said respective current-mirror output-side transistor;
   (f) a plurality of switching transistors each connected to the base of a respective one of said current-mirror output-side transistors for selectively bringing the respective current-mirror output-side transistor into an operative state or an inoperative state in response to a state of each said switching transistor; and
   (g) means for detecting a storage track when the given information is stored on the magnetic recording medium, said storage track detecting means being connected to said plurality of switching transistors, whereby said switching transistors selectively assume the operative state or inoperative state, depending on a detected value of said track detecting means, to bring required ones of said current-mirror output-side transistors in the operative state so that a required current corresponding to the storage track is able to flow to said coil.

2. A magnetic recording circuit according to claim 1, further comprising a track counter for detecting a position of said coil with respect to the magnetic recording medium and for issuing an output signal to selectively render said switching transistors operative and inoperative.

3. A magnetic recording circuit according to claim 2, wherein said track counter contains information stored therein as to which switching transistors are to be rendered operative depending on a position of the track.

4. A magnetic recording circuit according to claim 3, wherein said current-mirror output-side transistors have a common current characteristic for making respective resistance values of said resistors different, each of said resistors being connected to the base of a respective one of said current-mirror output-side transistors.

5. A magnetic recording circuit according to claim 4, wherein said resistors connected to said current-mirror output-side transistors are connected to the base of said current-mirror input-side transistor via another resistor.

6. A magnetic recording circuit according to claim 2, wherein said current-mirror output-side transistors have a common current characteristic for making respective resistance values of said resistors different, each of said resistors being connected to the base of a respective one of said current-mirror output-side transistors.

7. A magnetic recording circuit according to claim 6, wherein said resistors connected to said current-mirror output-side transistors are connected to the base of said current-mirror input-side transistor via another resistor.

8. A magnetic recording circuit according to claim 1, wherein said current-mirror output-side transistors have a common current characteristic for making respective resistance values of said resistors different, each of said resistors being connected to the base of a respective one of said current-mirror output-side transistors.

9. A magnetic recording circuit according to claim 8, wherein said resistors connected to said current-mirror output-side transistors are connected to the base of said current-mirror input-side transistor via another resistor.

* * * * *